Oct. 31, 1967  C. J. CLEMENTS, JR., ETAL  3,349,763
BLOOD PRESSURE MEASURING AND RECORDING DEVICE
Filed Jan. 22, 1965

INVENTORS
Clarence J. Clements, Jr.
William B. Leaf
BY Bacon & Thomas
ATTORNEYS

Oct. 31, 1967  C. J. CLEMENTS, JR., ETAL  3,349,763
BLOOD PRESSURE MEASURING AND RECORDING DEVICE
Filed Jan. 22, 1965  3 Sheets-Sheet 2

INVENTORS
Clarence J. Clements, Jr.
William B. Leaf
BY Bacon & Thomas
ATTORNEYS

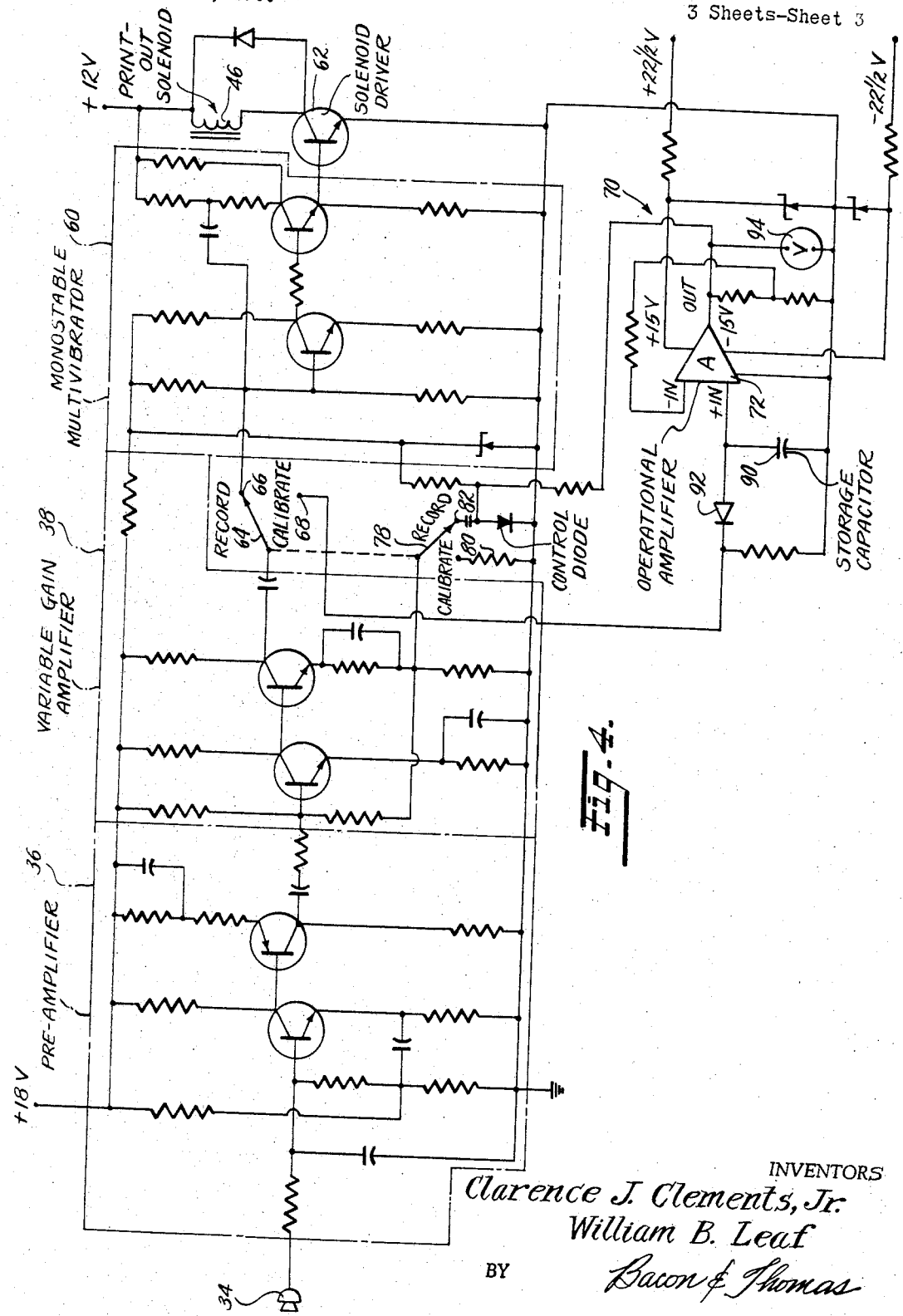

United States Patent Office 3,349,763
Patented Oct. 31, 1967

3,349,763
BLOOD PRESSURE MEASURING AND RECORDING DEVICE
Clarence J. Clements, Jr., and William B. Leaf, Silver Spring, Md., assignors to Prototypes, Incorporated, Kensington, Md., a corporation of Maryland
Filed Jan. 22, 1965, Ser. No. 427,344
12 Claims. (Cl. 128—2.05)

This invention relates to a blood pressure measuring and recording device, or recording sphygmomanometer.

The present invention comprises a novel instrument of the type set forth above, including an inflatable cuff for application to an arm or other portion of a patient's body, which cuff is then inflated sufficiently to completely occlude flow of blood in the member. At the same time a sensitive microphone is placed under or near the cuff to detect sound vibrations. Means are provided for inflating and deflating the cuff and for amplifying the electrical pulses produced by the microphone and operating a recording mechanism therewith. The general combination set forth above is old and known to the art but the present invention involves many novel features resulting in a more efficient and more accurate instrument.

The microphone, usually placed between the inflatable cuff and the arm, senses two principal stimulii. They are the Korotkoff sounds and artifactual pressure signals. These last, we believe, are due to a pulsating swelling of the arm as the heartbeat forces blood into the arterial network. The pressure signals are present at all times, whether the cuff is occluding the artery or not, and we have observed that they are generally in phase with the Korotkoff sounds. Despite a similarity in wave shape of blood flow noise and of the pressure pulses, we have been able to make an electrical separation of the two. First, we have found that filtering the signal from the microphone to remove most of the frequencies below about twenty cycles per second substantially improves the ratio of amplitude of even the lowest Korotkoff sounds to the amplitude of pressure pulses. Amplifying these pulses by a properly designed amplifier wherein the low frequency response of the amplifier was properly reduced effects a usable separation between the two. For example, the amplifier may have a band pass of about 20–80 c.p.s. Second, we have added a threshold circuit (a multivibrator) to the amplifier output and this multivibrator rejects all signals below a stipulated amplitude level. Thus, when the flow noise amplitude is standardized, as will be described, to reject the artifactual pressure pulse signals, the multivibrator will operate to accept only the flow noises, or Korotokoff sounds, which exist only between the diastolic and systolic pressure values. It has been found that this technic results in pulses wherein the artifiactual sounds are of generally the same amplitude and even the lowest amplitude Korotokoff sound defines a distinct amplitude difference over the artifactual sounds, thus giving a relatively sharp demarkation point. However, even the average level of the Korotkoff sound varies in amplitude and such variations are due to a number of factors including, strength of heartbeat, rigidity of arterial wall, length of sound path through the arm, attenuation by the tissues of the arm, placement of the microphone, etc. Thus, different measurements or measurements on different patients will produce Korotkoff sounds having peak amplitudes varying widely from case to case or from time to time. By controlling the low frequency response of the amplifier as discussed above and by varying the output thereof in accordance wtih the amplitude of the highest Korotkoff pulse, the line of demarkation between the Korotkoff sounds and the artifactual pulses can be placed at the level wherein the artifactual sounds are largely rejected by the amplifier and subsequently completely rejected by the multivibrator. The adjustment of the amplification of the amplifier may be performed either manually or automatically. In operating the instrument, the cuff may be completely inflated then deflated at a controlled rate with the output of the amplifier directed to a calibrating device. This calibrating device indicates the maximum pulse amplitude of the train of pulses, which then serves as a measure for adjusting the amplifier to bring the output thereof to a predetermined standard level. This can be accomplished either by observing the indicated value on the calibrating device and manually adjusting the amplifier or by directing the output of the calibrating device to a control means on the amplifier. After calibration of the amplifier the cuff may then again be inflated and deflated at a controlled rate with the output of the amplifier then directed to the multivibrator and recording device.

The present invention also involves means whereby a conventional squeeze bulb may be employed to inflate the cuff through a surge chamber whereby inflation of the cuff takes place in a steady and uniform manner, eliminating the pressure spurts or pulses which will result in artifactual operation. By this means the calibration of the instrument may be performed during inflation of the cuff and actual recording then can take place on deflation, in the usual manner. The present invention further includes novel manually operable control means for conditioning the instrument for the various modes of operation described above.

It is, therefore, a principal object of this invention to provide a recording sphygmomanometer that is sensitive to substantially only Korotokoff sounds, those between the systolic and diastolic pressure points.

Another object is to provide a device as set forth wherein, for each measurement therewith, the instrument may be accurately calibrated to render it sensitive to only those desired sounds.

Still another object of the invention is to provide an instrument as set forth above, including a threshold control device and a recording means wherein only pulses of greater than predetermined amplitude are recorded.

A further object is to provide an instrument of the type described employing only a single manual control member.

A still further object is to provide such a recording instrument employing a pulsing source of air pressure and means connected thereto to produce steady and uniform inflation of an occluding cuff, permitting calibration of the instrument as the cuff is being inflated.

An additional object is to provide an instrument as set forth above wherein calibration of an amplifier may be performed either manually or automatically.

Other and additional objects and advantages will become apparent to those skilled in the art as the description proceeds with reference to the accompanying drawings wherein:

FIG. 4 is a more detailed schematic diagram of the electrical circuits in the device illustrated in FIG. 1.

Figure 1:
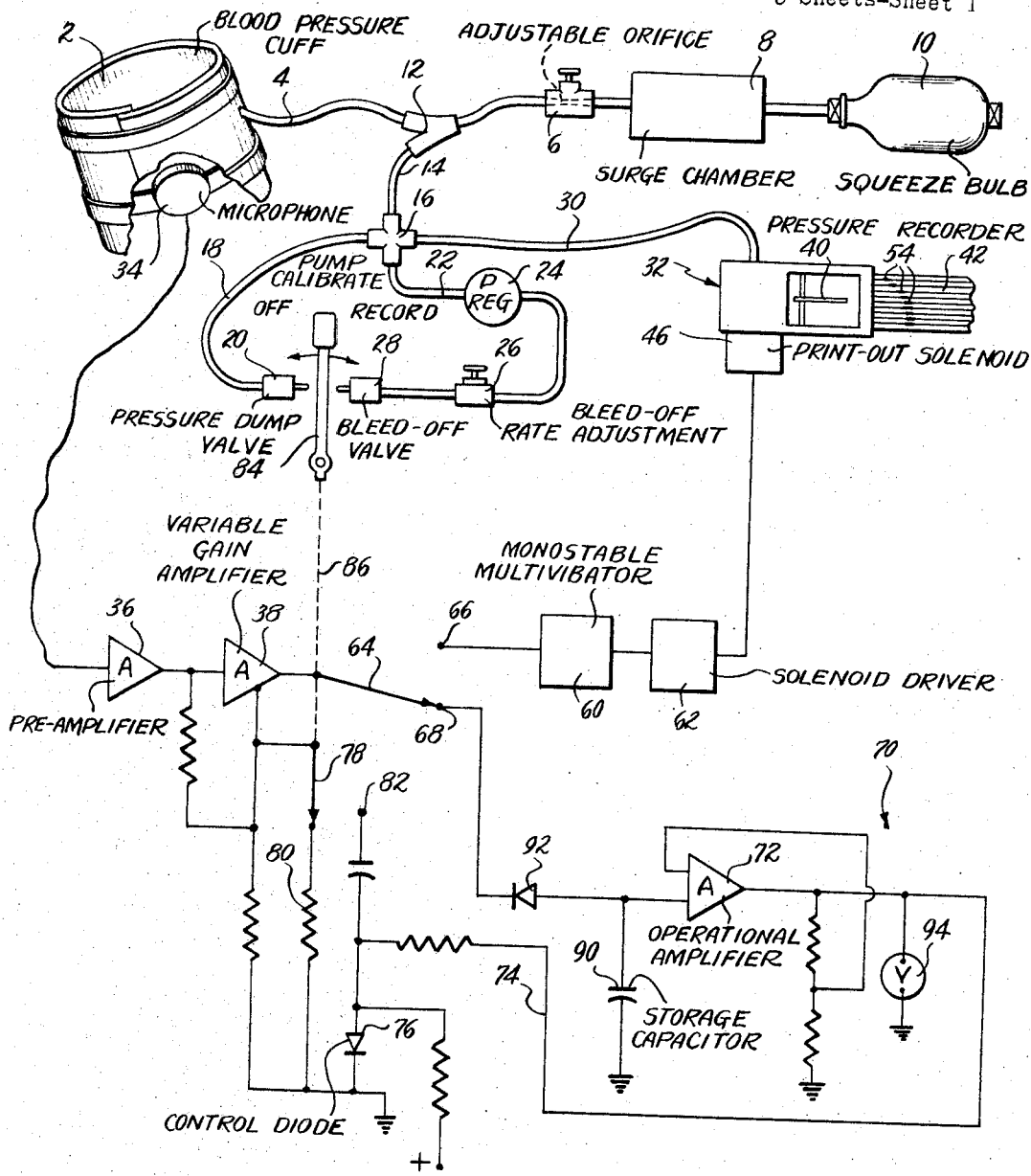
FIG. 1 is a highly diagrammatic illustration of one form of the apparatus with the electrical circuitry shown by block diagram.

Referring to FIG. 1, numeral 2 indicates generally an inflatable cuff which may be of known and conventional construction, adapted to be applied to a selected portion of the body of a patient and then inflated to stop the blood flow therepast. The cuff is inflated through a tubing 4 connected to an adjustable orifice valve 6 which in turn receives air pressure from a surge chamber 8 inflated by a conventional hand-operated squeeze bulb 10. As will be apparent, alternate compression and expansion of the bulb 10 results in pressure pulses being delivered to the surge chamber 8. The surge chamber 8, however, accumulates air under pressure and delivers it at a controlled slow rate through adjustable orifice valve 6 to the cuff 2 whereby the pressure build-up in the cuff is gradual and uniform. Alternatively, a surge-free pump or a storage vessel of compressed gas could be employed in place of the bulb 10 and surge chamber 8. A fitting 12 in tubing 4 provides a branch 14 leading to a further fitting 16 having three branches extending therefrom. A first branch 18 terminates in a normally closed valve 20 and when the valve 20 is open, obviously all pressure in the cuff 2 is rapidly released. Branch 22 from fitting 16 leads through a pressure regulator 24 and thence through an adjustable bleed-off orifice valve 26 to a terminal valve 28. The valve 28 is normally closed but when open it will permit deflation of the cuff 2 at a regulated and controlled rate, depending on the setting of the valve 26. A further branch tube 30 leads from the fitting 16 to a pressure recording device 32, to be described later. A microphone 34, very sensitive to low amplitude sounds, is preferably held by the cuff 2 against the patient's arm or the like and its output is directed through a pre-amplifier 36 and thence to a variable gain amplifier 38. The amplifier 38 is provided with a feed-back circuit, the resistance of which determines the total amplification in amplifier 38.

Figure 2:
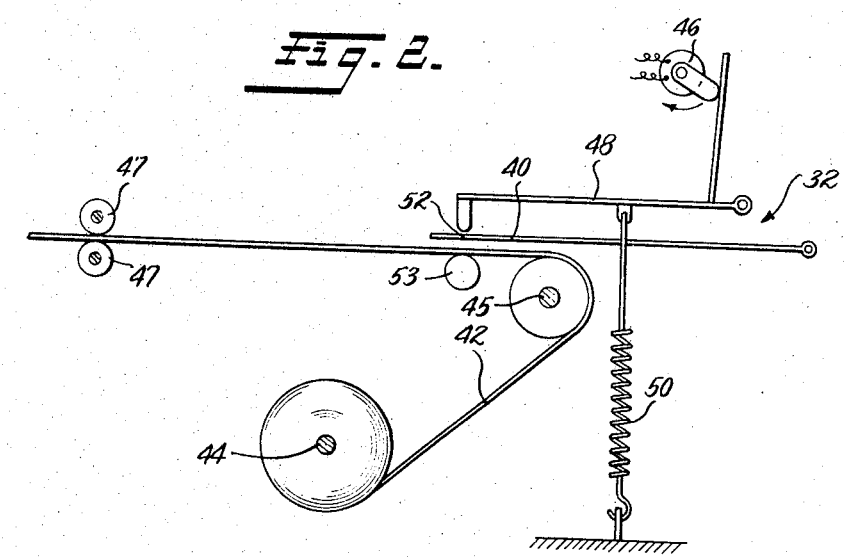
FIGS. 2 and 3 are schematic illustrations of alternative forms of electrically operated means comprising portions of a recording device.

The recorder 32 may be of a conventional form, schematically illustrated in FIG. 2. This form of recorder is known in the trade as a Rustrak recorder and the modification shown includes means (not shown) connected to the tube branch 30, previously referred to, so as to be responsive to the pressure then existing in the cuff 2. Those means effect movement of a recording stylus 40 transversely across the recording instrument, from side to side of the tape 42 (see also FIG. 1). The means referred to may be a Bourdon tube, bellows, or the like. Tape 42 is drawn longitudinally through the instrument by means of a clock-motor (not shown) which drives shaft 45 and rollers 47 and draws tape from a supply thereof on shaft 44 so as to move at a predetermined rate of speed. In the form shown in FIG. 2, an electrical pulse delivered to the solenoid 46 causes the same to rotate in a direction to release printing hammer 48 to the action of spring 50. Whereupon the spring draws the hammer 48 downwardly and the latter in turn engages stylus 40 to impact the portion 52 thereof against anvil roller 53 and against the tape 42 and to form a short linear mark thereon. For this purpose the tape 42 is preferably a pressure sensitive material. A plurality of such marks are shown in FIG. 1 at 54. It will be obvious that each recorded line or mark, indicative of an individual pulse, is displaced longitudinally of the tape and that the lateral position of each pulse on the tape 42 is in turn indicative of the pressure existing in the cuff 2 at the time that mark was made. Thus, the maximum and minimum pressure indicated by the group of marks 54 are indicative of the diastolic and systolic pressures measured by the instrument.

Figure 3:
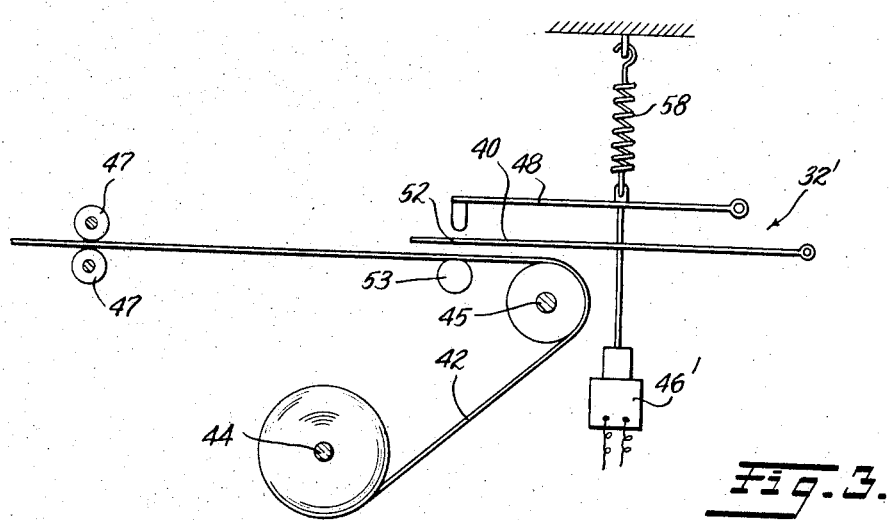

In the preferred form of recorder shown schematically in FIG. 3, parts identical to those of FIG. 2 bear the same reference numerals. In this form, however, the hammer 48 is normally held withdrawn from the indicator 40 by spring 58. The solenoid 46' is connected to one end of the spring 58 and thus when the solenoid is energized it pulls downwardly and impinges the hammer 48 against the indicator arm 40, the solenoid being powerful enough to overcome the spring 58. Thus, each pulse delivered to the solenoid produces a mark on the tape in the manner already described.

The multivibrator 60 delivers pulses to the solenoid driver 62, which in turn delivers those pulses to the solenoid of the recorder. The multivibrator 60 is connectible to the output of amplifier 38 through a switch 64 and a terminal 66 (FIG. 1). A second adjacent terminal 68 may also be engaged by the switch 64 to direct the output of amplifier 38 to a calibrating device indicated generally at 70 and including an operational amplifier 72. The output of the operational amplifier 72 is connected through a conductor 74 to a control network, including a control diode 76. The feed-back circuit of the amplifier 38 includes a switch 78 connectible either to a feed-back resistor 80 of fixed value or to a terminal 82 in the network including control diode 76.

As shown in FIG. 1, a single manually operable lever 84 is movable to three different positions and movement of the lever 84, through connection 86, operates the switches 64 and 78. In addition, the lever 74 controls switches for connecting suitable batteries (not shown) to the points shown on FIG. 4 as receiving either positive or negative voltages for operation of the various electrical circuits and devices. When the lever 84 is swung to the left of the position shown in full lines in FIG. 1, it engages the plunger of normally closed valve 20 to thus drop all pressure from the cuff 2 and the battery switch is opened thereby and thus the instrument is completely deactivated. As shown in full lines in FIG. 1, the lever 84 is in position for calibration. It is understood that during the calibration cycle, the cuff may be inflated gradually and uniformly or has been completely inflated and is being gradually deflated through means such as the valve 26, if such mode of operation is desired. During the calibration cycle switches 64 and 78 are in the positions shown in full lines. The feed-back circuit of amplifier 38 is through the fixed resistor 80 and thus the degree of amplification is predetermined and fixed at a standardized value and at the same time output of the amplifier 38 is directed to the calibration device. The calibration device includes, in addition to the amplifier 72, a storage capacitor 90 and an isolating rectifier diode 92. It will be apparent that succeeding pulses delivered by the amplifier 38 through the diode 92 tend to charge the capacitor 90 but only those pulses of higher amplitude than any preceding pulse will be effective to add to the charge on the capacitor 90. Thus, after a given series of Korotkoff pulses are delivered to the calibrating device the charge on capacitor 90 is representative of the amplitude of the highest of those pulses. The operational amplifier 72 is of high input impedance so that the charge remains on the capacitor 90 and since the amplifier 72 acts like a voltage follower, the capacitor 90 serves merely to control the output of the operational amplifier. It is contemplated that a manually operable adjustment may be employed in which case the output of the amplifier 72 is merely directed to an indicating meter 94 indicating an analogue value of the pulse of maximum amplitude. In such a manually operated construction, the connection of switch 78 to contact 82 would place a manually adjustable resistance element in the feedback circuit instead of the diode 76, which could then be manually adjusted to a value corresponding to the reading on the meter 94. In the form shown, however, the meter 94 is merely incidental, the output of the operational amplifier 72 is constant and directed through conductor 74 to the control diode 76 previously referred to. After the capacitor 90 has received a charge indicative of the maximum pulse value, the lever 84 is shifted to its recording position to the right of the full line position of FIG. 1. In that position the pressure in the cuff is permitted to bleed slowly through the rate adjustment valve 26 since the lever 84 will then hold valve 28 open, and the switches 64 and 78 will be moved respectively to terminals 66 and 82. The output of the amplifier 38 is then directed to the multivibrator and the recording device whereas the operational amplifier 72 remains in operation to produce a constant output voltage depending on the charge on the capacitor 90 and that voltage is supplied to the control diode 76 which has now been switched into the feedback circuit of amplifier 38 and the amplification thereof is varied in accordance with the value shown on meter 94 so that the maximum pulse amplitude output of the amplifier 38 is at a standard or predetermined level. Thus, the pulses fed to the multivibrator and recorded are always of the same maximum amplitude regardless of the actual sound amplitudes picked up by the microphone 34.

As will be apparent to those skilled in the art, the effect of the control voltage output of amplifier 72 on the amplifier 38 is to change the gain of the amplifier 38 in inverse proportion to the value indicated on meter 94.

The control device 76 is shown as a semi-conductor diode, which shows an increase in incremental resistance as the current through it is decreased. Thermistors also display the property of resistance change as the current through them is varied and such a device could also be used in place of the diode 76. The essential characteristic is that the control device have the characteristics of a nonlinear resistance and there are other ways, known to those skilled in the art, by which such results may be achieved. Such devices may be used either in the feedback circuit or in series with or shunting the amplifier input or output, all as is known.

The valves 20 and 28 previously described may be valves similar or identical to conventional tire inflation valves having stems directed outwardly therefrom which when depressed cause the valve to move to open position. It is further contemplated that the connection 86 between lever 84 and switches 64 and 78 be of such nature that the switches are moved to and from their two described positions only by movement of the lever 84 between its calibrating position shown in full lines and its recording position. Such results may be achieved by forming the switch elements 64 and 78 as leaf springs engageable by the lever 84 only when moved in one particular direction. It is further contemplated that in the automatic form illustrated in FIG. 1 a further switch be provided to be actuated by the lever 84 when moved to its off position to then discharge the capacitor 90 in preparation for a subsequent cycle of operation. Such switch has been omitted from the drawing (also the battery control switch) for the purpose of clarity but it will be obvious to those skilled in the art how such devices may be incorporated.

FIG. 4 is a more detailed schematic diagram of the circuits in the preamplifier 36, variable gain amplifier 38, multivibrator 60, solenoid driver 62, operational amplifier 72, and the related circuits. Those parts of the circuits identified by reference numerals in FIG. 1 are identified in FIG. 4 by the same reference numerals.

It will be recognized by those skilled in the art that comparable results may be achieved by holding the amplification of amplifier 38 at a fixed value and using the output of amplifier 72 to vary the threshold amplitude value of the multivibrator 60.

While a limited number of specific embodiments of the invention have been shown and described herein, it is to be understood that the same are merely exemplary of the principles involved and that other embodiments may be resorted to within the scope of the appended claims.

We claim:

1. A blood pressure measuring device comprising: an inflatable cuff for occluding and restoring blood flow in response to pressure variations therein; a microphone for detecting body sounds adjacent said cuff and producing signal pulses corresponding thereto; a variable gain amplifier for amplifying said pulses; recording means responsive to said amplified pulses and to the pressure in said cuff for making a record of said pulses and pressure; calibrating means for determining the maximum amplitude of any pulse of a predetermined series of pulses; means for varying the gain of said amplifier in accordance with said maximum amplitude whereby the output of said amplifier is set at a predetermined value for an input thereto corresponding to the amplitude of said pulse of maximum amplitude; and first switching means for selectively connecting the output of said amplifier to either said calibrating means or said recording means.

2. A device as defined in claim 1 wherein said means for varying the gain of said amplifier comprises a manually adjustable variable impedance element, said calibrating means including an indicator for indicating a value corresponding to the amplitude of said pulse of maximum amplitude.

3. A device as defined in claim 1 wherein said means for varying the gain of said amplifier comprises a non-linear impedance device, said calibrating means comprising a device for producing a steady voltage output corresponding to the amplitude of said pulse of maximum amplitude; and means connecting said voltage output to said non-linear impedance device.

4. A device as defined in claim 3 wherein said means for varying the gain of said amplifier is a feedback circuit and further includes a fixed-impedance element; and further switching means for selectively connecting either said fixed-impedance element or said non-linear impedance device into said feedback circuit.

5. A device as defined in claim 4 including manually operable means for simultaneously operating said first and further switch means so that the output of said amplifier is connected to said recording means when said non-linear impedance device is in said feedback circuit and to said calibrating means when said fixed-impedance element is in said feedback circuit.

6. A device as defined in claim 1 wherein said amplifier has a band pass of from about 20 to about 80 c.p.s.

7. A device as defined in claim 1 wherein said recording means includes threshold circuit means for receiving said pulses from said amplifier, said threshold circuit means rejecting all pulses having an amplitude less than a predetermined value.

8. A blood pressure measuring device comprising: an inflatable cuff for occluding and restoring blood flow in response to pressure variations therein; pulse generating means including a microphone adjacent said cuff for generating electrical pulses corresponding to sounds detected by said microphone; recording means responsive to said pulses and to the pressure in said cuff for making a record of said pulses and pressure; calibrating means for determining the maximum amplitude of any pulse of a predetermined series of pulses; manually movable means for selectively directing said pulses to either said calibrating means or said recording means; means for inflating or deflating said cuff, including a source of pulsating air pressure; means defining a surge chamber arranged to receive pulses of air from said source; means for conducting air from said chamber to said cuff and including a restricted orifice whereby said cuff may be smoothly and uniformly inflated from said source; and first selectively operable valve means for bleeding pressure from said cuff at a predetermined uniform rate.

9. A device as defined in claim 8 wherein said first valve means includes a first normally closed valve adjacent said manually movable means, said manually movable means being arranged to engage and open said first normally closed valve when moved to a first position to direct said electrical pulses to said recording means and to permit said first normally closed valve to close when moved to a second position to direct said electrical pulses to said calibrating means.

10. A device as defined in claim 9 including a second normally closed valve, adjacent said manually movable means, arranged to rapidly exhaust all pressure from said cuff when open; said manually movable means engaging and opening said second valve when moved to a third position.

11. A blood pressure measuring device comprising: an inflatable cuff for occluding and restoring blood flow in response to pressure variations therein; a microphone for detecting body sounds adjacent said cuff and producing signal pulses corresponding thereto; an amplifier for amplifying said pulses; recording means responsive to said amplified pulses and to the pressure in said cuff for making a record of said pulses and pressure; threshold circuit means for directing pulses from said amplifier to said recording means; calibrating means for determining the maximum amplitude of any pulse of a predetermined series of pulses; control means for varying the operation of one of said amplifiers or said threshold circuit means in accordance with said maximum amplitude whereby a predetermined maximum value pulse is delivered to said recording means irrespective of the amplitude of said pulse of maximum amplitude at said microphone; and switching means for selectively connecting the output of said amplifier to either said calibrating means or said threshold circuit means.

12. A blood pressure measuring device comprising: an inflatable cuff for occluding and restoring blood flow in response to pressure variations therein; a microphone for detecting body sounds adjacent said cuff and producing signal pulses corresponding thereto; a variable gain amplifier for amplifying said pulses; recording means responsive to said amplified pulses and to the pressure in said cuff for making a record of said pulses and pressure; calibrating means for varying the gain of said amplifier in accordance with predetermined characteristics of sounds picked up by said microphone; and switching means for selectively connecting the output of said amplifier to either said calibrating means or said recording means.

References Cited
UNITED STATES PATENTS

| | | | |
|---|---|---|---|
| 1,686,504 | 10/1928 | Dodge et al. | 128—2.1 |
| 2,865,365 | 12/1958 | Newland et al. | 128—2.05 |
| 2,944,542 | 7/1960 | Barnett et al. | 128—2.05 |
| 3,148,677 | 9/1964 | Smith | 128—2.05 |

RICHARD A. GAUDET, *Primary Examiner.*

SIMON BRODER, *Examiner.*